United States Patent [19]
Wilson et al.

[11] 3,911,323
[45] Oct. 7, 1975

[54] GROUND FAULT PROTECTOR WITH ARCING FAULT INDICATOR

[75] Inventors: John T. Wilson; James C. Wilson, both of Beaver, Pa.

[73] Assignee: Westinghouse Electric Corporation, Pittsburgh, Pa.

[22] Filed: Feb. 19, 1974

[21] Appl. No.: 443,884

[52] U.S. Cl. ............................... 317/18 R; 340/255
[51] Int. Cl.$^2$ .......................................... H02H 3/04
[58] Field of Search .......... 317/18 R, 18 D; 340/255

[56]  References Cited
UNITED STATES PATENTS

| | | | |
|---|---|---|---|
| 3,473,091 | 10/1969 | Morris et al. | 317/18 D |
| 3,654,515 | 4/1972 | Kato et al. | 340/255 |
| 3,657,714 | 4/1972 | Kessler | 340/255 |

*Primary Examiner*—James D. Trammell
*Attorney, Agent, or Firm*—M. J. Moran

[57]  ABSTRACT

A ground fault detector having an indicator which indicates the presence of a ground or similar fault in an electrical line to be protected where the fault current is not of sufficient magnitude to cause the ground fault indicator to trip a circuit breaker to thereby interrupt the circuit in which the ground fault current is flowing. The indicating circuit provides a recognizable warning that a ground fault has begun or is in progress so that appropriate steps may be taken to cure the fault to locate the fault, or to indicate the relative magnitude of the fault current before it worsens.

4 Claims, 6 Drawing Figures

GROUND FAULT PROTECTOR WITH ARCING FAULT INDICATOR

CROSS REFERENCE TO RELATED APPLICATIONS

Certain inventions related to those disclosed in the present application are disclosed and claimed in copending applications (now U.S. Pats., Nos. 3,721,862 by G. Watson, and M. B. Brennen, 3,733,517 by J. T. Wilson, and 3,697,810 by J. T. Wilson, all of which are assigned to the assignee of the present invention.

BACKGROUND OF THE INVENTION

This invention relates to ground fault sensor or detector circuits and it has particular relationship to ground fault detector circuits which include means for indicating the presence of a relatively low level ground fault which in itself is of insufficient magnitude to cause a circuit breaker protecting the line in which the ground fault current flows to trip.

Known types of ground fault sensor or ground fault detector circuits are disclosed in the above crossed referenced related U.S. Pats. The latter mentioned related U.S. Pats. apply to ground fault detectors which do not generally provide an indication of a relatively low level ground fault so that corrective action may be taken to eliminate a ground fault before it becomes of sufficient magnitude to trip a circuit breaker. In addition, an indicator circuit for static overcurrent relays is described in U.S. Pat. No. 3,573,556 by Stanley E. Zocholl issued Apr. 6, 1971. The patent to Zocholl teaches generally an indicator circuit for a static overcurrent relay, but does not disclose an indicator for use with a ground fault detector such as the type described in the related applications or in this application. It would be advantageous to provide a ground fault indicator which has the capability of sensing the beginning stages of a ground fault or of sensing a relatively low level ground fault so that a warning indication may be given or a relay may be tripped which would thereafter cause affirmative action to be taken.

SUMMARY OF THE INVENTION

In accordance with the present invention a ground fault indicator or a ground fault circuit is provided which has as part thereof an indicator which provides an indication of the presence of ground fault current in an electrical circuit breaker before the ground fault current is of a predetermined magnitude sufficient to cause a circuit interrupter which is also part of the ground fault detector to interrupt that circuit. The ground fault detector taught in this application provides a multi-level or multi-signal ground fault indication. The first signal is of a preliminary nature and provides an alert to the fact that a ground fault is beginning to occur or is in the early stages of occurrence so that corrective action may be taken to remove the source of ground fault before the circuit in which the ground fault current flows is interrupted. In another level of action, if the ground fault continues unabated and increases to a substantial level, the ground fault indicator will trip a circuit interrupter or circuit breaker to protect the circuit in which the ground fault current is flowing. In accordance with this invention the ground fault detector and indicating circuit may be used in conjunction with other ground fault detecting and indicating circuits in other parts of an electrical distribution system to pinpoint the location of a ground fault, it being a well known characteristic of ground fault detectors to react sequentially until the ground fault is cleared or otherwise accounted for.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENTS

Figure 1:
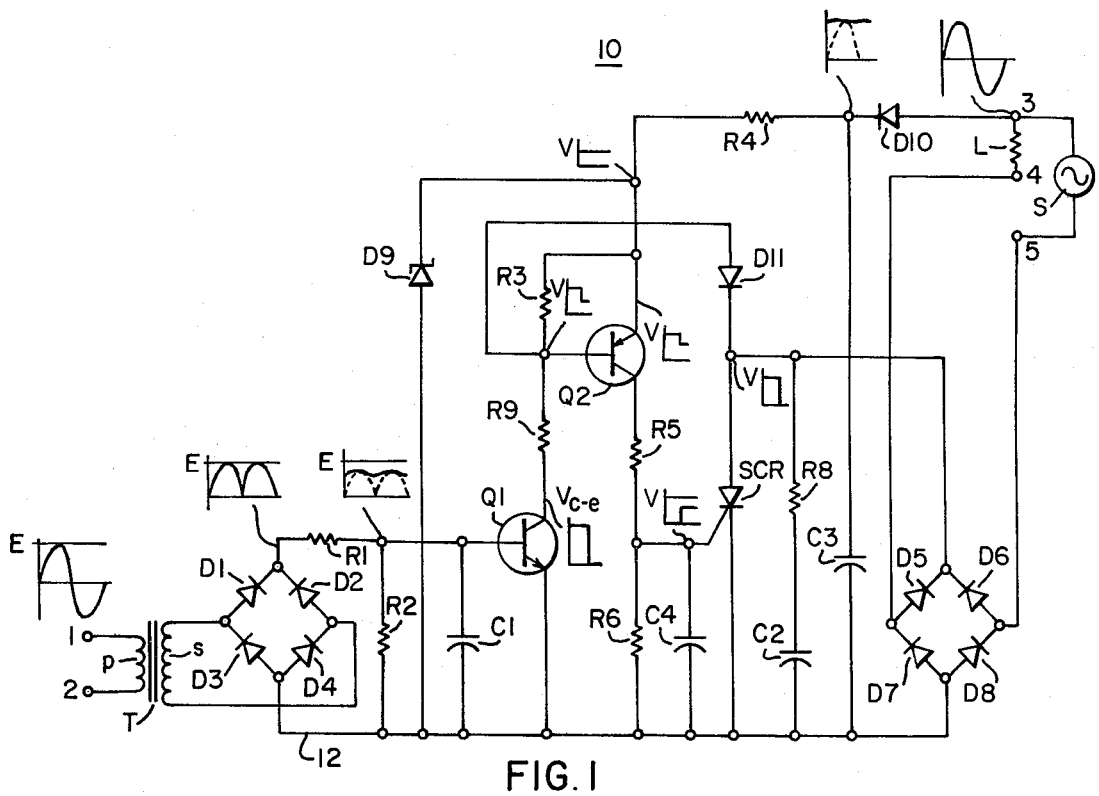
FIG. 1 shows a schematic circuit diagram of the ground fault detector indicating circuit.

Referring now to the drawings and FIG. 1 in particular, a ground fault detector indicating circuit for a low level or insipient ground fault is shown. To the left in FIG. 1 is shown a pair of input terminals 1 and 2 for the arcing fault indicator. Terminals 1 and 2 are adapted to accept an alternating current input signal from any convenient source. In a specific embodiment of the invention terminals 1 and 2 are connected to output terminals 6 and 7 (not shown) of the remaining portions of the ground fault detector of this invention. The signal provided across terminals 1 and 2 is an alternating voltage signal which may be related to the amount of electrical current flowing in a circuit to be protected or more particularly to a ground fault current in a circuit to be protected. Typically, in the preferred embodiment of the invention, the voltage signal impressed across terminals 1 and 2 is of a magnitude of between 5 and 30 volts AC. Typically this signal is provided to terminals 1 and 2 when the ground fault current is between 30% and 50% of the preselected indicator value of the ground fault detector shown in FIG. 4. The signal provided to terminals 1 and 2 excites the primary winding P of a transformer T and is reflected into a secondary winding S of the transformer T. The output terminals of the secondary winding S are connected across the input terminals of a full wave bridge rectifier network D1 through D4. The output terminals of the full wave bridge rectifier network D1 through D4 are connected at the low side thereof to a system common line 12 and at the high side thereof to one end of a resistive means R1. The other end of the resistive means R1 is connected to one end of another resistive means R2, the other end of which is also connected to the common line 12. Also connected at the junction between the resistive means R1 and R2 is the base of a transistor Q1 and one side of a capacitive element or capacitor C1. The other side of the capacitive element or capacitor C1 is also connected to the system common 12. The emitter of the transistor Q1 which is in this embodiment of the invention is of the NPN type is also connected to the system common 12. The collector of transistor Q1 is connected to one side of a resistive element R9, the other side of which is connected to the base of a PNP transistor Q2 and one side of a resistive element R3. The other side of the resistive element R3 is connected to the emitter of the aforementioned transistor Q2. The collector of the transistor element Q2 is connected to one side of a resistive element R5, the other side of which is connected jointly to one side of a resistive element R6, to one side of a capacitive element C4, and to the gate of a silicon controlled rectifier or similar gated device SCR. The other sides of the resistive element R6 and the capacitve element C4 as well as the cathode of the silicon controlled rectifier SCR are connected to the system common 12. The anode of the silicon controlled rectifier SCR is connected to one side of a resistive means R8, one side or the output terminal of a bridge network D5 through D8 and the cathode of a diode element D11. The anode of the diode element D11 is connected to the base of the previously described transistor Q2. The other side of the resistive element R8 is connected to one end of the capacitive element C2. The other end of the capacitive element C2 and the other output terminal of the bridge rectifier means D5 through D8 are also connected to the system common 12. Connected across the terminals 3 and 5 of the circuit of FIG. 1 is a source of alternating current S. Connected between the terminals 3 and 4 of the circuit of FIG. 1 is a load L. Connected internally to the terminals 4 and 5 of the circuit of FIG. 1 are the input terminals for the full wave bridge rectifying means D5 through D8. Also connected to terminal 3 of the circuit of FIG. 1 is the anode of a diode D10. The cathode of diode D10 is connected to one side of a resistive means R4 and to one side of the capacitive element C3. The other side of a capacitive element C3 is connected to the system common 12. The other side of the resistive element R4 is connected to the emitter of the previously described transistor element Q2 and to the regulating terminal of a Zener diode D9. The other terminal or anode of the Zener diode D9 is also connected to the system common terminal 12.

The circuit of FIG. 1 operates as follows, power supply S provides a alternating current to terminals 3 and 5 of the circuit of FIG. 1. The alternating current provided by the source S is half wave rectified by the diode element D10 and filtered by the storage capacitive element or filter element C3. The resulting voltage is then dropped or reduced by the dropping resistor R4 and regulated by the regulating terminal of the Zener diode D9. In one embodiment, the Zener Diode is chosen to regulate the voltage to approximately 60 volts. As was described previously the alternating current provided at the input terminals 1 and 2 is full wave rectified by the rectifier means or full wave rectifier bridge D1 through D4. The full wave rectified signal is provided to the voltage divider comprising the resistive element or resistors R1 and R2. The reduced voltage at the base of transistor Q1 is filtered by the capacitive element or filter capacitor C1 to provide a direct current signal between the base and the emitter of the transistor Q1. The level of this signal varies in general proportion to the amplitude of the input signal between the terminals 1 and 2. Transistor Q1 is normally in the off state that is it is not conductive between its collector to emitter until the direct current voltage between the base and emitter thereof reaches a certain predetermined value which is related to the amount of fault current flowing in the circuit to be protected. Such being the case electrical current is conducted from the regulated end of the dropping resistor R4, through a voltage divider comprising the resistive elements R3 and R9 and through the conducting collector to emitter circuit of the transistor Q1. The base of the transistor Q2 which is connected to the junction point between the resistive elements R3 and R9 is biased to be normally off but becomes conducting when the collector current of transistor Q1 flows through the voltage divider comprising the resistive element R3 and R9. Such being the case current then flows from the regulated terminal of the Zener diode D9 through the emitter to collector circuit of the now saturated or turned on transistor Q2 and through a voltage divider comprising resistive elements R5 and R6. The voltage at the junction between resistive elements R5 and R6 moves from a normally zero value to a finite value sufficient to turn on or actuate the silicon controlled rectifier SCR at its gate. The silicon controlled rectifier SCR when conducting forward biases the diode D11 thus latching on the transistor Q2. Concurrently the gated on SCR provides a general short circuit between the output terminals of the previously described bridge D5 through D8, thus connecting the load L to the power supply S to allow the load to be energized by the alternating current of the power supply S. In this embodiment of the invention the load L comprises an indicating light but may comprise a solid state or mechanical relay. The combination of the capacitive element C2 and the resistive element R8 provides a DV/DT snub or noise suppressor for the silicon controlled rectifier SCR, that is it absorbs transient voltage spikes which may otherwise act to gate the silicon controlled rectifier SCR on at the anode to cathode circuit thereof. The transistor Q1 may be thought of as a level detector which will gate on or fire when the base to emitter voltage thereof is 0.6 volts or greater in the case of a silicon transistor.

In summary, it can be seen that an AC signal of predetermined value, which may range between 5 and 30 volts in one embodiment and which represents the flow of ground fault current in a load to be protected (not shown) turns on a level detector when the previously described voltage reaches a certain predetermined level. This provides an indication or reaction which may be the illumination of an indicating lamp or the actuation of a relay means as described previously. The circuit is especially suited for giving an indication of the presence of low level ground fault current. That is, of providing an indication of ground faults that are not sufficient to cause a circuit breaker or circuit interrupter to be tripped by the ground fault detector which may be connected to the input terminals 1 and 2.

Figure 2:
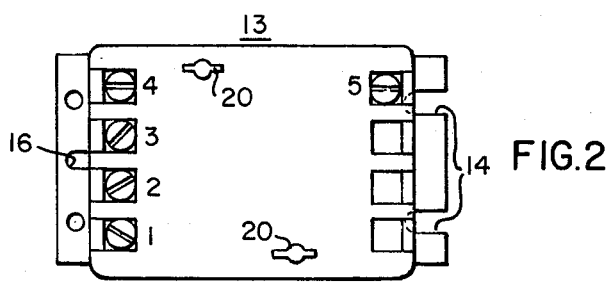
FIG. 2 shows a top view of the container in which the circuitry of FIG. 1 is disposed.

Referring now to FIG. 2, a top view of a package, enclosure or container 13 for the circuit of FIG. 1 is shown. The spaces or openings 14 and 16 are provided for convenient mounting on the ground fault detector or a relay which utilizes the output signal from the circuit of FIG. 1. The output terminals 1 and 2 are shown as well as the power supply and load connecting input terminals 3, 4 and 5. Lugs 20 are also shown which are useful for physically attaching the container of FIG. 2 to a relay or similar device other than by way of providing bolts of other fastening means through the openings or holes 16 and 14.

Figure 3:
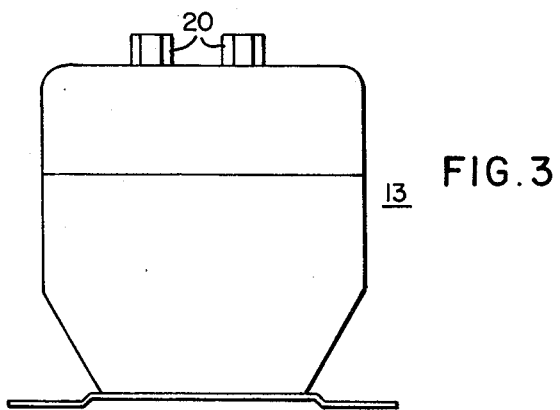
FIG. 3 shows a side view of the container of FIG. 2.

Referring now to FIG. 3 a side view of the can or container of FIG. 2 is shown including the lugs 20.

Figure 4:
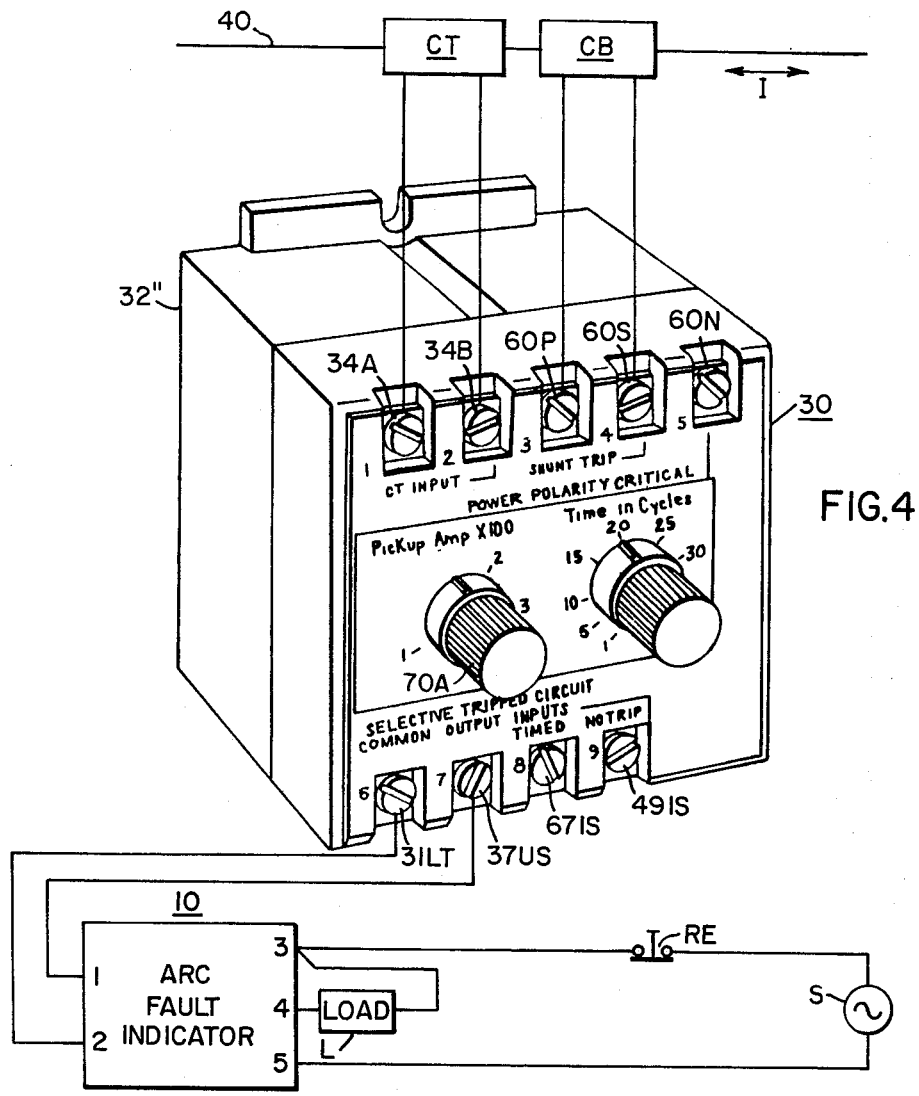
FIG. 4 shows a functional representation of a ground fault detector and indicating system.

Referring now to FIG. 4 a functional diagram of an electrical system including a ground fault detector 30, a sensing means for sensing electrical current or ground fault current CT, a circuit breaker or circuit interrupter CB and an arcing fault indicator 10 is shown. In this embodiment of the invention alternating electrical current I flows through the separable main contacts (not shown) of the circuit breaker CB breaker and through the current sensing means or current transformer CT. The circuit breaker is connected to the ground fault detector 30 at the terminals 60P and 60S. The current transformer or sensing means CT is connected to the ground fault detector 30 at the input terminals 34A and 34B. Connected to the output terminals 31LT and 37US, terminals 6 and 7 respectively of the ground fault detector 30 are the input terminals 1 and 2 of the arc fault indicator 10. Connected to the terminals 3 and 5 of the indicator 10 is a source of power S and connected to the terminals 3 and 4 is a load L which in this case may be an indicator. Connected between one terminal of the source S and the terminal 3 is a reset means RE. The selector dial 70A of the ground fault indicator 30 may be positioned in any number of different settings such as shown on the front panel of the ground fault detector 30, generally designated "pick-up amp × 100". Generally when the current I in the line 40 reaches a predetermined value as sensed by the current transformer or similar means CT which value is dependent upon the setting of the selector 70A, a circuit breaker is actuated to interrupt the current I. However if the current is of a relatively low value relative to the setting of the selector 70A such as between 30 precent and 50 percent of the value at which the selector 70A is positioned, a signal is provided on terminals 6 and 7, 31LT and 37US respectively, which actuates the arcing fault indicator or indicating circuit 10. When current I reaches a predetermined value which is in envisioned to be significantly lower than the value of current I sufficient to cause the circuit breaker CB to trip or actuate, the indicating lamp relay or logic circuitry, indicated by the reference L, is actuated. As was described previously the energy for this actuation is provided by the source S. The lamp L and the circuitry of the arc fault indicator 10 may be reset by actuating the reset RE. It is to be understood with respect to the embodiment shown in FIG. 4 that the value of current I at which a signal may be present at the output terminals 6 and 7 of the ground fault detector 30 is variable over a predetermined range which may be generally between 20 percent and 60 percent of the full rated current I. The total range or tolerance of current values over which the arc fault indicator 10 may provide an indication at the load L is typically varied between 30 percent and 50 percent of the current I.

Figure 5:
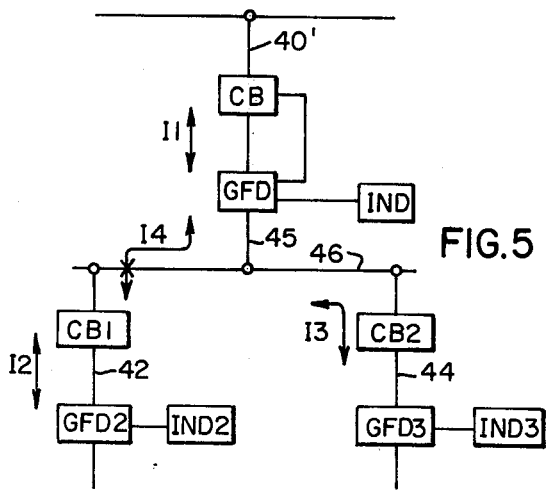
FIG. 5 shows a ground fault locating electrical system.

Referring now to FIG. 5 a transmission network, grid electrical network distribution network or feeler network with utilization or branch circuits and including a circuit breaker CB connected to a ground fault detector GFD which has an indicator IND associated therewith is shown. The ground fault detector GFD protects the line 45. It will be noted that currents I2 and I3 flowing in circuit branches 42 and 44 respectively, through circuit breaker contacts CB1 and CB2 respectively are components of a main supply current I1. Current I1 flows through circuit breaker CB and ground fault detector GFD. The ground fault detector GFD may have an indicator IND such as described in the embodiments of the present invention associated therewith. In an operational example, if the circuit breakers CB1 and CB2 were rated at 200 amps it can be readily determined that the ground fault detector GFT should not cause the circuit breakers CB to trip at less than 400 amps and likely at a significantly higher value. However, if 300 amperes of current I1 would flow through circuit breaker CB it would not be of significant value to cause the circuit breaker CB to open. A sufficient increase in the load current, such as is indicated by I4 may be present on the bus 46 due to a ground fault at point X. It can be seen in this situation that the circuit breakers CB1 and CB2 would not trip nor would the circuit breaker CB trip. However, a current or sustained fault current I4 may likely cause substantial damage to the bus 46 or to insulations or may cause a fire. The presence of the indicator circuit IND in conjunction with the ground fault detector GFD will indicate currents of the order of magnitude of I4 even though the ground fault detector GFD does not provide a signal to the circuit breaker CB to cause an opening thereof. As can be seen, this is very useful for localizing or pinpointing ground faults such as at position X on bus 46. If the indicator lamp in the indicator IND were to illuminate and similar indicators IND2 and IND3 associated with ground fault detectors GFD2 and GFD3 and lines 42 and 44 respectively were not to illuminate it could reasonably be surmised that the ground fault existed between the ground fault detector GFD and the ground fault detectors GFD2 and GFD3.

Figure 6:
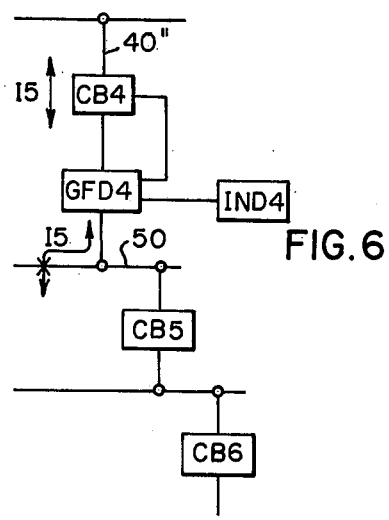
FIG. 6 shows another ground fault locating electrical system.

Referring now to FIG. 6 another network arrangement in which the ground fault detector indicator system is helpful is shown. In this case if there is a breaker I5, which would otherwise be sufficient to trip circuit breake CB5 and CB6 but which does not flow therethrough because of the presence of a ground fault X in line 50, the indicator IND4 associated with the ground fault detector system GFD4 may be adjusted to provide an indication of the presence of ground fault current I5 even though ground fault detector GFD4 is programmed not to react to the presence of such a ground fault current to cause the circuit breakers GB4 to actuate, to open to protect line 40''.

It is to be understood that the circuit arrangement in FIGS. 5 and 6 are not limiting and many circuit arrangements having the potential for ground faults may be protected by the ground fault detector/indicator systems of this invention. It is also to be understood that the packaging or containers shown in FIGS. 2 and 3 are not limiting and the ground fault detection equipment may be placed in any convenient package including a portion of the ground fault detector enclosure 30 shown in FIG. 4. It is also to be understood that the current sensing means CT may be a current transformer. It is also to be understood that the various circuit breakers described with respect to the embodiments of the invention may be circuit interrupters or any other means for effectively opening a circuit in which ground fault current is flowing. It is also to be understood that the loads indicated with respect to FIGS. 4 and 1 may be lamp relays or logic elements or any other elements sufficient to provide an indication either directly or indirectly of the presence of ground fault current. It is also to be understood that the values of ground fault current described and the limits of ranges described herein are not limiting but are only helpful in describing the various embodiments of the invention. It is also to be understood that the transistors and gated devices of FIG. 1 are not limiting and other suitable static devices may be utilized to provide the indication at the load L.

It is also to be understood that the drawings are not limiting in nature. In some cases the drawings have been simplified for convience of illustrations. As an example in regard to FIGS. 5 and 6 drivers or driver circuits for the Ground Fault Protectors are not shown although they may be useful in some instances such as when more than four Ground Fault Protectors are connected together in circuit relationship.

The apparatus embodying the teachings of this invention has several advantages one of which is the fact that the presence of an insipient or relatively low level ground fault current which may be very insiduous in nature may be detected and accounted for without causing the circuit breaker which is to be controlled by the ground fault detector to be actuated. Another advantage lies in the fact that the grond fault detector may be used to localize or locate ground faults without causing the tripping or actuation of circuit breakers.

What we claim as our invention is:

1. A fault indicator for a ground fault detector comprising, sensing means for sensing ground fault current in an electrical circuit and providing an output signal related to said ground fault current without causing interruption of said circuit, non-magnetic indicating means including an input terminal connected to said sensing means for receiving said output signal therefrom, said indicating means providing an indication of the presence of said ground fault current in said electrical circuit before said ground fault current is of a predetermined value sufficient to cause said sensing means to cause said circuit to be interrupted by separate interrupting means.

2. A multi-level ground fault detector comprising, sensing means for sensing current in an electrical circuit and providing an output signal related to the level of said current, non-magnetic indicating means including an input terminal connected to said sensing means for receiving said output signal and providing an indication of the presence of a first predetermined level of said current, circuit interrupting means for interrupting at least a portion of said current after said current has reached a second predetermined level.

3. The combination as claimed in claim 1 wherein said indicating means provides an indication of the relative magnitude of said ground fault circuit.

4. The combination as claimed in claim 2 wherein said indicating means provides an indication of the relative magnitude of said ground fault current.

* * * * *